(12) United States Patent
Darnaud et al.

(10) Patent No.: US 11,660,239 B2
(45) Date of Patent: May 30, 2023

(54) ELECTRONIC DEVICE FOR CONTROLLING AN ACCESS RAMP TO VEHICLE DOOR, VEHICLE, STEERING METHOD AND COMPUTER PROGRAM THEREFOR

(71) Applicant: TRANSDEV GROUP, Issy les Moulineaux (FR)

(72) Inventors: Thomas Darnaud, Versailles (FR); Nicolas Desmoineaux, Courbevoie (FR); Cem Karaoguz, Palaiseau (FR)

(73) Assignee: TRANSDEV GROUP INNOVATION, Issy-les-Moulineaux (FR)

( * ) Notice: Subject to any disclaimer, the term of this patent is extended or adjusted under 35 U.S.C. 154(b) by 686 days.

(21) Appl. No.: 16/593,908

(22) Filed: Oct. 4, 2019

(65) Prior Publication Data

US 2020/0155385 A1 May 21, 2020

(30) Foreign Application Priority Data

Oct. 5, 2018 (FR) ...................................... 18 59246

(51) Int. Cl.
*A61G 3/06* (2006.01)
*G05D 1/00* (2006.01)

(52) U.S. Cl.
CPC ........... *A61G 3/061* (2013.01); *G05D 1/0088* (2013.01); *A61G 2203/30* (2013.01)

(58) Field of Classification Search
CPC ....... Y10S 414/134; A61G 3/06; A61G 3/062; A61G 3/061; A61G 3/067; A61G 2203/30; A61G 2203/32; A61G 2203/34; A61G 2203/36; A61G 2203/38; A61G 2203/40; A61G 2203/42; A61G 2203/44; A61G 2203/46; G05D 1/0088; B60P 1/43; B60P 1/431; B60P 1/435; B60P 1/438

USPC .................................................... 414/921, 537
See application file for complete search history.

(56) References Cited

U.S. PATENT DOCUMENTS

| | | | | |
|---|---|---|---|---|
| 5,832,555 | A | * 11/1998 | Saucier | ................... B60P 1/431 14/71.1 |
| 9,126,522 | B1 | * 9/2015 | Perez | ...................... B60P 1/433 |
| 2009/0106918 | A1 | 4/2009 | Van Roosmalen et al. | |
| 2009/0274542 | A1 | * 11/2009 | Pocobello | .............. A61G 3/067 414/522 |

(Continued)

FOREIGN PATENT DOCUMENTS

EP    3 311 785 A1    4/2018

OTHER PUBLICATIONS

Preliminary Search Report received in French Patent Application No. 1859246 dated Jul. 19, 2019.

*Primary Examiner* — Glenn F Myers
(74) *Attorney, Agent, or Firm* — Knobbe, Martens, Olson & Bear, LLP

(57) ABSTRACT

The invention relates to an electronic device for controlling an access ramp to a door of a vehicle, the ramp being able to move from a retracted configuration to a deployed configuration. The electronic device includes:
- a detection module configured to detect, via at least one sensor, at least one element of interest located in an area near the door, each sensor being able to be connected to the detection module;
- a command module configured to command the passage of the ramp from one configuration to the other configuration as a function of the detection of an element of interest.

9 Claims, 4 Drawing Sheets

(56) References Cited

U.S. PATENT DOCUMENTS

| | | |
|---|---|---|
| 2015/0047133 A1 | 2/2015 | Sveum |
| 2018/0044124 A1 | 2/2018 | Vollmar et al. |
| 2019/0083334 A1* | 3/2019 | MacPherson .......... A61G 3/061 |
| 2019/0106042 A1* | 4/2019 | Hill ........................ A61G 3/061 |
| 2020/0026281 A1* | 1/2020 | Xiao .................. G06Q 10/0832 |

\* cited by examiner

ELECTRONIC DEVICE FOR CONTROLLING AN ACCESS RAMP TO VEHICLE DOOR, VEHICLE, STEERING METHOD AND COMPUTER PROGRAM THEREFOR

CROSS-REFERENCE TO RELATED APPLICATIONS

This application is a U.S. non-provisional application claiming the benefit of French Application No. 18 59246, filed on Oct. 5, 2018, which is incorporated herein by reference in its entirety.

FIELD OF THE INVENTION

The present invention relates to an electronic device for controlling an access ramp to a vehicle door.

The invention also relates to a vehicle, in particular an autonomous vehicle, comprising a door, an access ramp to the door and such an electronic device for controlling the ramp.

The invention also relates to a method for controlling an access ramp to a vehicle door, the control method being implemented by such an electronic device for controlling the ramp.

The invention also relates to a non-transitory computer-readable medium including a computer program including software instructions which, when executed by a computer, implement such a control method.

The invention relates to the field of autonomous motor vehicles, in particular autonomous motor vehicles having a level of automation greater than or equal to 3 on the scale of the Organisation Internationale des Constructeurs Automobiles [International Organization of Motor Vehicle Manufacturers] (OICA).

In particular, the invention relates to accessibility for persons with reduced mobility in such an autonomous vehicle. A person with reduced mobility (called PRM hereinafter) is a person whose movements and displacements are hindered, temporarily or permanently, whether due to size, condition (health, excess weight, etc.), age, permanent or temporary disability, objects or people he is transporting, or apparatuses or instruments he must use to move. Thus, a PRM is for example a disabled person with sensory or intellectual disabilities, a disabled person with motor disabilities, a person in a wheelchair, a person of short stature, a person with cumbersome luggage, an elderly person, a pregnant woman, a person with a shopping cart, or a person with one or several young children (including in a stroller).

BACKGROUND

A manual command is known of the placement of a ramp facilitating access to a vehicle for a PRM. In particular, when a PRM arrives in front of a bus door, the bus driver places a ramp after having been asked by the PRM or after having seen the PRM waiting on the sidewalk to board the bus. Once the PRM has entered the bus, the driver stores the ramp.

However, such placement of the ramp is not always optimal, and can in particular be time-consuming and tedious.

SUMMARY

The aim of the invention is then to propose an electronic device and an associated method for controlling a ramp for accessing a vehicle door making it possible to improve access for people, in particular PRMs, wishing to enter the vehicle.

To that end, the invention relates to an electronic device for controlling an access ramp to a door of a vehicle, the ramp being able to move from a retracted configuration to a deployed configuration, the electronic device including a detection module configured to detect, via at least one sensor, at least one element of interest located in an area near the door, each sensor being able to be connected to the detection module; and a command module configured to command the passage of the ramp from one configuration to the other configuration as a function of the detection of at least one element of interest.

Thus, with the electronic control device according to the invention, the detection module makes it possible to detect an element of interest capable of causing difficult access to the vehicle. Then the command module, as a function of the element of interest, commands the deployment of the ramp in order to allow improved access to the vehicle, for all people wishing to enter the vehicle, in particular for PRMs.

The electronic control device according to the invention is then particularly advantageous when the element of interest is for example a wheelchair, the electronic control device according to the invention then allowing the PRM to access the vehicle easily and quickly.

According to other advantageous aspects of the invention, the electronic piloting device comprises one or more of the following features, considered alone or according to all technically possible combinations:

- the at least one of the sensors is a camera embedded in the vehicle;
- for each point of the nearby area, the distance between the door and said point is smaller than a maximum predetermined distance;
- the electronic device further includes an activation module configured to command the detection module, the activation module being able to detect the presence of a person in an area near the door of the vehicle;
- each element of interest is chosen from among the group consisting of: a characteristic of a person with reduced mobility, and an obstacle that may hinder the passage of the ramp from one configuration to the other;
- the command module is configured to command the passage of the ramp from the retracted configuration to the deployed configuration only if a characteristic of a person with reduced mobility is detected;
- the detection module is configured to assign each element of interest a confidence index as a function of predetermined parameters, the command module being able to command the passage of the ramp from one configuration to the other configuration as a function of the result of the comparison of the confidence index of each element of interest to at least one predetermined threshold value; and
- the electronic device further includes a generating module configured to generate an information signal relative to the configuration of the ramp, the information signal being intended for a user or an electronic supervision system.

The invention also relates to a vehicle, in particular an autonomous motor vehicle, comprising a door, an access ramp to the door and an electronic device for controlling the ramp, the electronic control device being as defined above.

The invention also relates to a method for controlling an access ramp to a vehicle door, the control method being implemented by an electronic control device and comprising the following steps:

- detecting, via at least one sensor, at least one element of interest located in an area near the door;
- commanding the passage of the ramp from one configuration to the other configuration as a function of the detection of at least one element of interest.

The invention also relates to a non-transitory computer-readable medium including a computer program including software instructions which, when executed by a computer, implement a control method as defined above.

BRIEF DESCRIPTION OF THE DRAWINGS

These features and advantages of the invention will appear more clearly upon reading the following description, provided solely as a non-limiting example, and done in reference to the appended drawings, in which.

DETAILED DESCRIPTION

The terms "vertical" and "horizontal" are to be understood generally relative to the typical directions of a vehicle traveling on a horizontal surface.

The term "transverse" is defined generally relative to a horizontal direction and substantially orthogonal to the movement direction of a vehicle.

Figure 1:
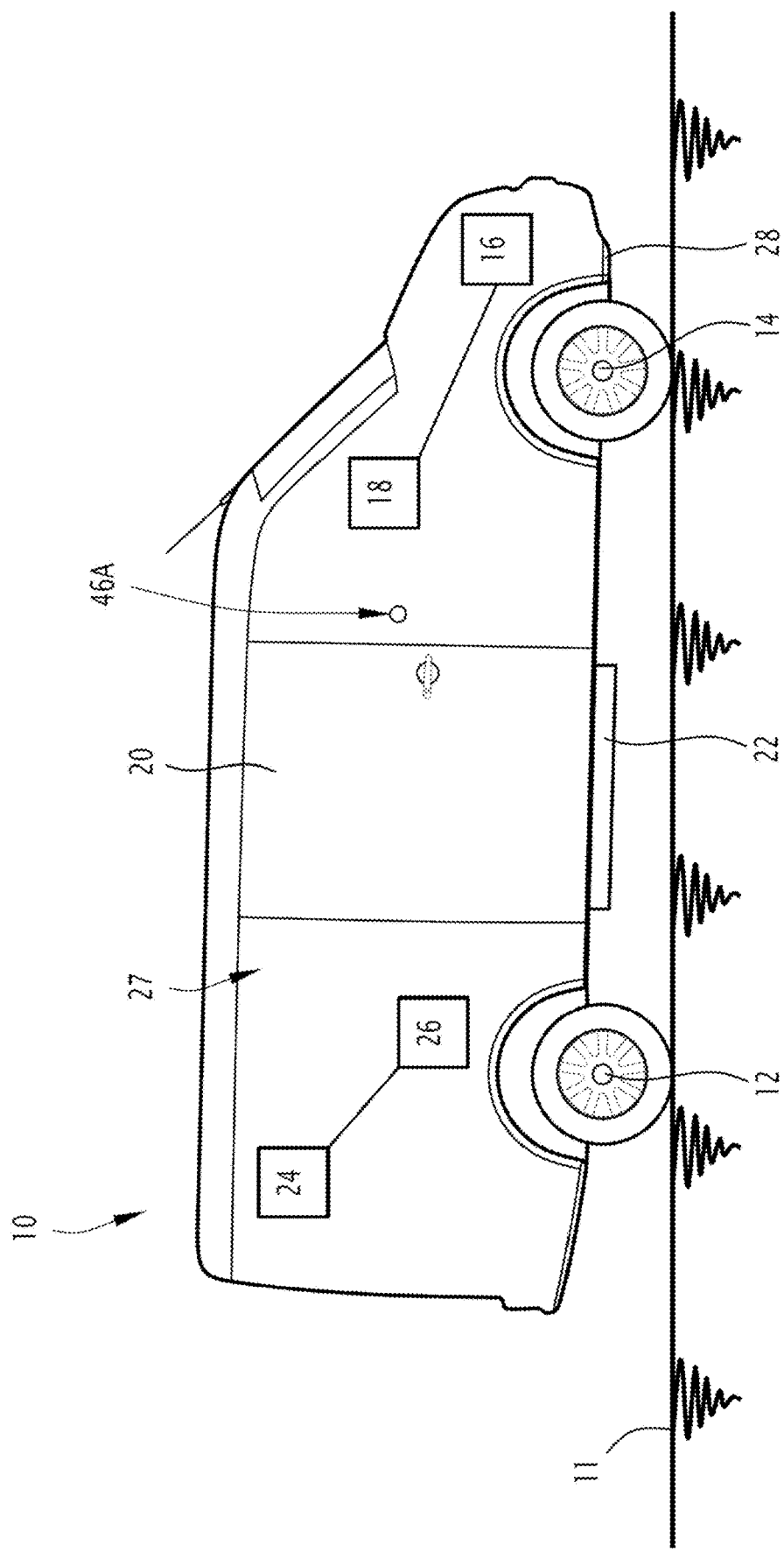
FIG. 1 is a schematic illustration, from the side, of a vehicle according to the invention, comprising a door, an access ramp to the door, an electronic device for controlling the ramp and a sensor connected to the electronic control device.
Figure 2:
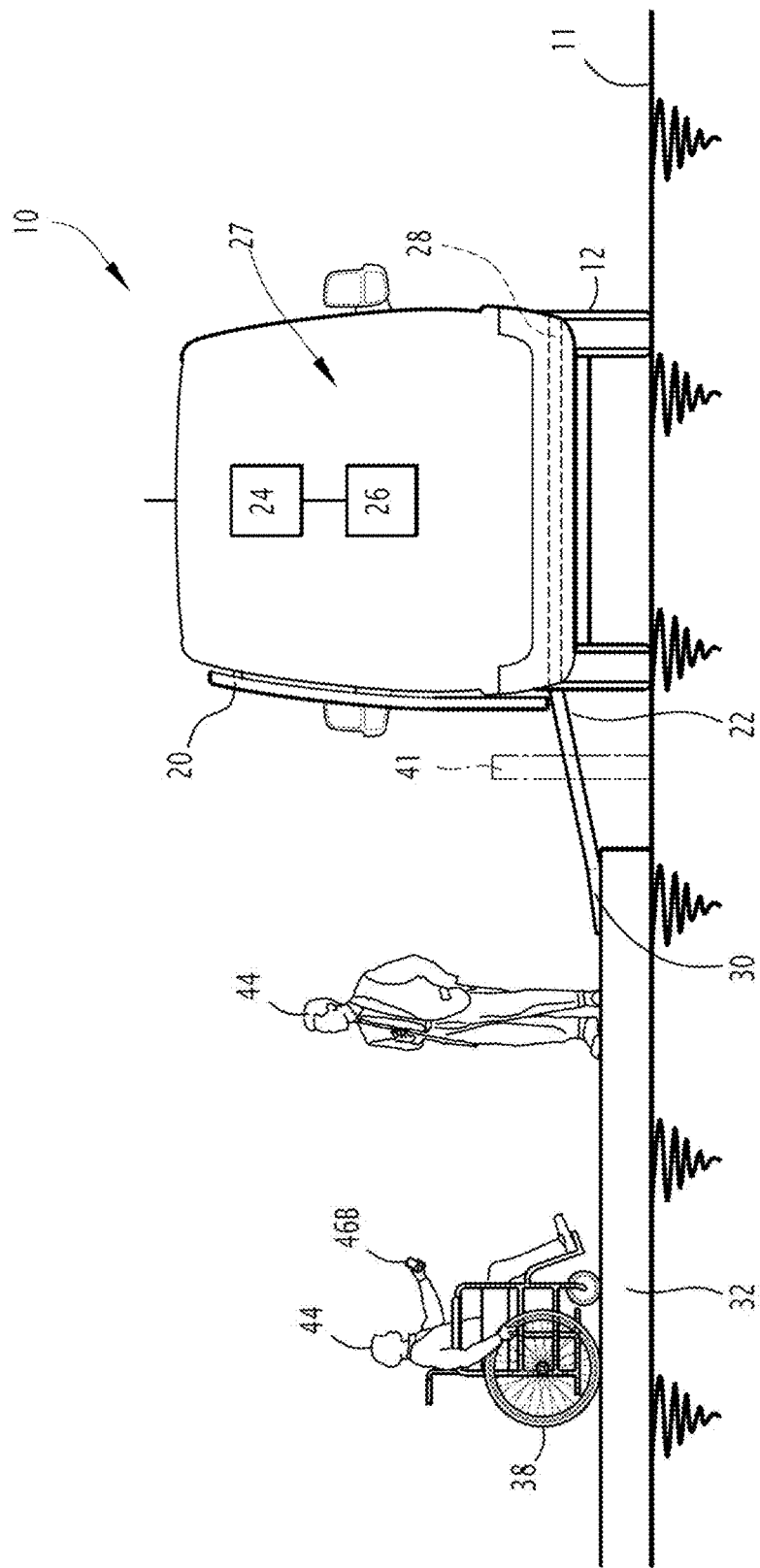
FIG. 2 is a schematic illustration, from the back, of the vehicle of FIG. 1.
Figure 3:
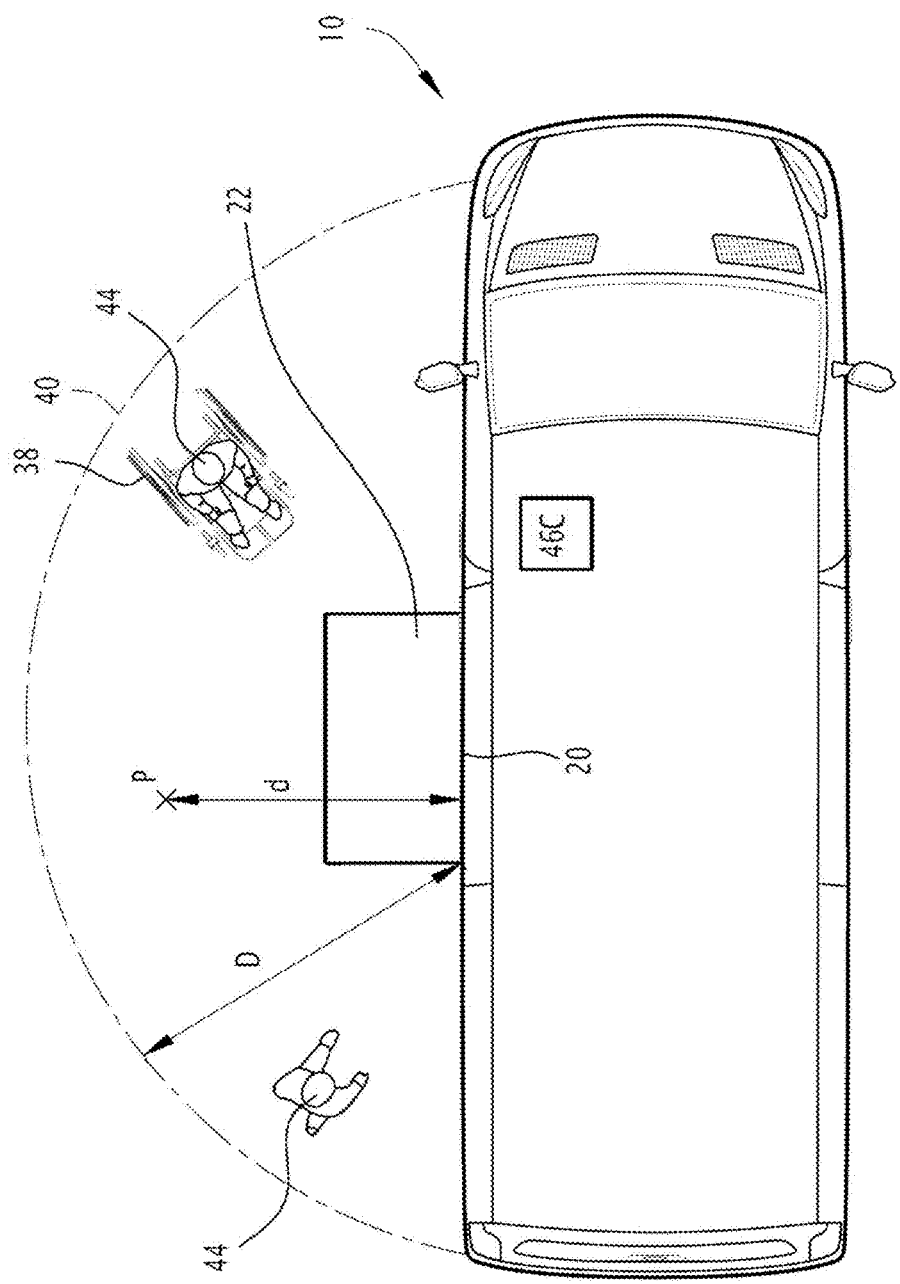
FIG. 3 is a schematic illustration, from above, of the vehicle of FIG. 1.

A vehicle 10 according to the invention is shown in FIGS. 1 to 3. The vehicle 10 is for example a motor vehicle, in particular a bus, configured to move on a road 11. The vehicle 10 comprises, in a known manner, rear wheels 12, front wheels 14, a motor 16 mechanically connected via a transmission chain (not shown) to the rear 12 and/or front 14 wheels for the driving of said wheels 12 and/or 14 in rotation around their axis, a steering system (not shown), suitable for acting on the wheels 12 and/or 14 of the vehicle 10 so as to modify the orientation of its trajectory, and a braking system (not shown), suitable for exerting a braking force on the wheels 12, 14 of the vehicle 10.

The vehicle 10 is typically made up of a traction and/or electric propulsion vehicle. To that end, the motor 16 is made up of an electric motor, and the vehicle 10 comprises an electric battery (not shown) electrically connected to the motor 16 to supply the motor 16 with electricity.

Additionally, the vehicle 10 is preferably an autonomous motor vehicle. To that end, the vehicle 10 comprises an electronic autonomous driving device 18 suitable for controlling the vehicle 10 autonomously by receiving information on the environment of the vehicle 10 by means of environment sensors (not shown) and by acting on the motor 16, the steering system and the braking system, so as to modify the speed, the acceleration and the trajectory of the vehicle 10 in response to the received information.

The autonomous vehicle 10 preferably has a level of automation greater than or equal to 3 on the scale of the Organisation Internationale des Constructeurs Automobiles (OICA). The level of automation is then equal to 3, that is to say, a conditional automation, or equal to 4, that is to say, a high automation, or equal to 5, that is to say, a full automation.

According to the OICA scale, level 3 for conditional automation corresponds to a level for which the driver does not need to perform continuous monitoring of the driving environment, while still having to be able to take back control of the autonomous motor vehicle 10. According to this level 3, a system for managing the autonomous driving, on board the autonomous motor vehicle 10, then performs the longitudinal and lateral driving in a defined usage case and is capable of recognizing its performance limits to then ask the driver to take back dynamic driving with a sufficient time margin.

The high level of automation 4 then corresponds to a level for which the driver is not required in a defined usage case. According to this level 4, the system for managing the autonomous driving, on board the autonomous motor vehicle 10, then performs the dynamic longitudinal and lateral driving in all situations in this defined usage case.

The full automation level 5 lastly corresponds to a level for which the system for managing the autonomous driving, on board the autonomous motor vehicle 10, performs the dynamic lateral and longitudinal driving in all situations encountered by the autonomous motor vehicle 10, throughout its entire journey. No driver is then required.

The vehicle 10 also comprises at least one door 20, an access ramp 22 to the door 20, at least one sensor 24 and an electronic device 26 for controlling the ramp 22.

The vehicle 10 has an inner volume 27 configured to receive passengers and/or goods to be transported. The inner volume 27 communicates with the outside of the vehicle 10 at least via the door 20. The door 20 is configured to allow the passengers and/or goods to pass from the outside of the inner volume 27 to the inside of the inner volume 27, and vice versa. The inner volume 27 is in particular delimited by a floor 28, on which the passengers and/or goods move inside the inner volume 27. The door 20 is in particular a side door defining a transverse opening extending vertically from the floor 28.

In a known manner, the ramp 22 is able to move from a retracted configuration, shown in FIG. 1, to a deployed configuration, shown in FIGS. 2 and 3. The vehicle 10 also comprises an actuating motor, not shown, connected to the ramp 22 and configured to take the ramp 22 mechanically from one configuration to the other. The ramp 22 is for example in plate form, as shown in FIG. 2, this plate sliding relative to the floor 28 as described hereinafter, or being articulated relative to the floor 28.

In the retracted configuration, the ramp 22 is arranged below the floor 28. In particular, the ramp 22 does not extend transversely past the floor 28. As an example, the ramp 22 is located in a housing, not shown, protecting the ramp 22 from outside impacts.

In the deployed configuration, the ramp 22 protrudes transversely from the floor 28 toward the outside of the vehicle 10. The ramp 22 comprises an end 30 located opposite the floor 28, the end 30 being able to be in contact with the road 11 or a sidewalk 32. The ramp 22 then typically has a slope of between 0% and 8% with the floor 28. The ramp 22 then forms a continuous connection extending from the road 11 or the sidewalk 32 toward the floor 28 of the vehicle 10. In the deployed configuration, the access to the vehicle 10 for a PRM located on the road 11 or the sidewalk 32 is thus greatly simplified.

Each sensor 24 is able to be connected to the electronic control device 26. According to one additional aspect of the invention, the at least one of the sensors 24 is a camera embedded in the vehicle 10. The camera is oriented toward the outside of the vehicle 10. The camera is for example arranged near the door 20. "Near" refers to a distance from the door 20 of less than 1 m.

Figure 4:
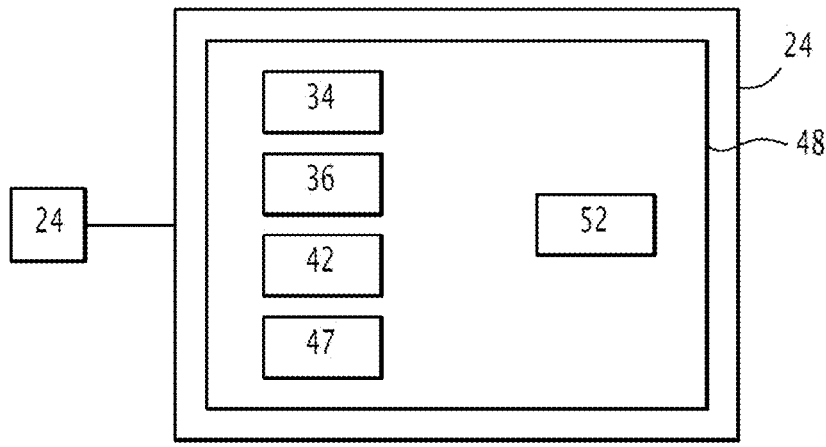
FIG. 4 is a schematic illustration of the electronic control device of FIG. 1.

As shown in FIG. 4, according to the invention, the electronic control device 26 comprises a detection module 34 and a command module 36.

The detection module 34 is configured to detect, via the at least one of the sensors 24, at least one element of interest 38 located in an area 40 near the door 20. The at least one sensor 24 is able to be connected to the detection module 34.

The detection module 34 is configured to detect said at least one element of interest 38 via the implementation of an image processing algorithm known in itself when the sensor 24 is a camera.

The detection module 34 is configured to detect an element of interest 38 after at least one identification of said element of interest 38 in the nearby area 40 at a given moment in time. In particular, the detection module 34 is configured to detect an element of interest 38 after a single identification of said element of interest 38. In a variant, the detection module 34 is configured to detect an element of interest 38 after a plurality of successive identifications of said element of interest 38 at successive moments in time; or after a plurality of identifications of the element of interest 38, for which the ratio of the number of identifications of the element of interest 38 relative to a number of attempts at such identifications during a given time period, that is to say, relative to a number of search operations for said element of interest 38 during a given time period, is above a predefined value, for example the median value equal to 0.5. The element of interest 38 detection errors are thus greatly minimized.

Each element of interest 38 is chosen from among the group consisting of: a characteristic of a PRM and an obstacle 41 that may hinder, that is to say, obstruct, the passage of the ramp 22 from one configuration to the other.

A characteristic associated with a PRM is chosen from among the group consisting of: a characteristic object associated with a PRM, a dynamic characteristic of a PRM or a static characteristic of a PRM.

A characteristic object associated with a PRM is a specific object held by, or in contact with, the PRM, for example a wheelchair, as illustrated in FIG. 2, or a cane, crutches, a stroller, a suitcase, a shopping cart, etc.

A dynamic characteristic of the PRM is typically a characteristic movement of the PRM, for example a particular action such as a limp, a slow movement speed, difficulty entering the vehicle 10, etc.

A static characteristic of the PRM is typically a characteristic posture of the PRM, for example a significant curvature of the back, a posture with a significant asymmetry, etc.

An obstacle 41 capable of hindering the passage of the ramp 20 from one configuration to the other is for example a post, as illustrated in FIG. 2, or an anti-parking bollard, a bag or a person located opposite the door 20, another vehicle parked next to the vehicle 10, etc.

One skilled in the art will understand that a characteristic of the PRM is located outside the travel of the ramp 22. Indeed, a characteristic of the PRM that is located on the travel of the ramp 22 would then be considered a potential obstacle 41.

As shown in FIG. 3, for each point P of the nearby area 40, the distance d between the door 20 and said point P is smaller than a predetermined maximum distance D. In a known manner, the distance from a point to a segment is defined as the distance from the point to the orthogonal projection of the point on the straight line passing through the segment, when this orthogonal projection belongs to the segment. When the orthogonal projection relative to the straight line passing through the segment does not belong to this segment, the distance from the point to the segment is defined by the minimum distance from the point to one of the two ends of the segment. The predetermined maximum distance D is for example between 20 cm and 75 cm. The nearby area 40 is for example a half-disc like in the example of FIG. 3, an elliptical half-surface, a half-stage, an oblong surface or a disc portion with an angular opening smaller than 180°. The nearby area 40 is preferably centered on the door 20.

The detection module 34 is configured to send a message to the command module 36 comprising at least one piece of information on each detected element of interest 38.

According to one additional aspect of the invention, the detection module 34 is configured to assign each element of interest 38 a confidence index as a function of predetermined parameter(s). The predetermined parameter(s) make it possible to characterize the relevance of the elements of interest 38, and in particular the characteristic(s) associated with the PRM and the obstacle(s) 41. The confidence index is for example calculated via a predefined mathematical algorithm or a neural network. As an example, the confidence index is a value of between 0 and 1. The detection module 34 is configured to assign a confidence index increasing with the relevance of the element of interest 38. A value of 1 means that the detection module 34 is sure of the relevance of the element of interest 38. A value of 0 means that the detection module 34 is sure that the element of interest 38 is not relevant.

The command module 36 is configured to receive the message sent by the detection module 34. The command module 36 is configured to command the passage of the ramp 22 from one configuration to the other configuration as a function of the detection of element(s) of interest 38. In particular, the command module 36 is configured to send a corresponding command instruction to the motor associated with the ramp 22 in order to deploy or retract the ramp 22.

According to one additional aspect of the invention, the command module 36 is configured to command the passage of the ramp 22 from the retracted configuration to the deployed configuration in case of detection of at least one element of interest 38 located outside the travel of the ramp 22. In particular, the command module 36 is configured to command the passage of the ramp 22 from the retracted configuration to the deployed configuration only in case of detection of a characteristic of a PRM, the characteristic of the PRM being outside the travel of the ramp 22. Thus, the control module 36 is configured to command the deployment of the ramp 22 only in case of presence of a PRM near the vehicle 10 and outside the travel of the ramp 22.

In a variant or additionally, the command module 36 is configured to block the passage of the ramp 22 in case of detection of at least one element of interest 38 located on the travel of the ramp 22. In particular, the command module 36 is configured to block the passage of the ramp 22 from the retracted configuration to the deployed configuration or vice versa, in case of detection of an obstacle 41 capable of hindering the passage of the ramp 22 from one configuration to the other. Thus, the command module 36 is configured to prevent the deployment or the retraction of the ramp 22 if an obstacle 41 is present on the travel of the ramp 22 capable of blocking or damaging the ramp 22.

In addition, the command module 36 is preferably configured to command the passage of the ramp 22 from the retracted configuration to the deployed configuration only in case of detection of a characteristic of a PRM, the characteristic of the PRM located outside the travel of the ramp 22 and in the absence of detection of at least one obstacle 41 located on the travel of the ramp 22.

According to an additional aspect of the invention, the command module 36 is able to command the passage of the ramp 22 from one configuration to the other configuration as a function of the result of the comparison of the confidence index of each element of interest 38 by the detection module 34 to at least one predetermined threshold value. The predetermined threshold value(s) make it possible to define an acceptable error level on the relevance of the element of interest 38. The value of the predetermined threshold is less adjustable as a function of the accepted error level. In particular, the command module 36 is able to command the passage of the ramp 22 from the retracted configuration to the deployed configuration only when the confidence index of at least one characteristic of a PRM is above a first predetermined threshold value SH, called upper threshold, and when the confidence index of any potential obstacle 41 is below a second predetermined threshold value SB called lower threshold. One skilled in the art will understand that the fact that the confidence index of any potential obstacle 41 is below the lower threshold SB corresponds to an absence of obstacle 41 on the travel of the ramp 22 with a sufficient likelihood. The upper threshold SH is preferably higher than the lower threshold SB. As an example, the value of the upper threshold SH is 0.8 and the value of the lower threshold SB is 0.2.

When the confidence index of no characteristic of a PRM is above the upper threshold and at least one confidence index of a characteristic of a PRM is between the lower threshold SB and the upper threshold SH, the command module 36 is capable of commanding the detection module 34 such that the detection module 34 again launches a detection of elements of interest 38. In addition, the command module 36 is capable of generating an invitation signal intended for the person(s) 44 present in the nearby area 40 inviting them to approach the sensor 24. This makes it possible to refine the confidence index of the element of interest 38 initially present between the two thresholds SB, SH so that this confidence index becomes higher than the upper threshold SH or lower than the lower threshold SB.

When said confidence index is still between the two thresholds SB, SH after the generation of the invitation signal and a predetermined time limit has been exceeded, the command module 36 is able to assign an arbitrary confidence index higher than the upper threshold SH conservatively so as to lift the uncertainty. In a variant, the command module 36 is able to assign an arbitrary confidence index lower than the SB.

In a variant, when said confidence index is between the two thresholds SB, SH, the command module 36 is configured to send a request comprising information on the uncertain element of interest 38 to a monitoring device outside the vehicle 10. The command module 36 is further configured to receive, in return, a response from the outside monitoring device, this response comprising a corrected confidence interval higher than the upper threshold SH or lower than the lower threshold SB for the uncertain element of interest 38. The corrected confidence interval is for example determined by an operator as a function of the received information on the uncertain element of interest 38.

The confidence interval for example represents the likelihood that the element of interest 38 is a characteristic of a PRM when it is located outside the travel of the ramp 22, or that the element of interest 38 is an obstacle 41 when it is located within the travel of the ramp 22. Thus, the command module 36 is able to command the deployment of the ramp 22 only in case of detection of a PRM outside the travel of the ramp 22 and an absence of obstacle 41 with a likelihood greater than a predetermined threshold likelihood. The command module 36 is further able to block the deployment of the ramp 22 in case of detection of an obstacle 41 with a likelihood greater than a predetermined threshold likelihood.

In addition, the command module 36 is only able to command the passage of the ramp 22 from the deployed configuration to the retracted configuration when the confidence index of each element of interest 38 is below the lower threshold SB. Thus, the command module 36 is able to command the retraction of the ramp 22 in case of likelihood of presence of a PRM or of an obstacle 41 below a predetermined threshold likelihood.

In a variant, the command module 36 is able to command the passage of the ramp 22 from one configuration to the other configuration as a function of the result of the comparison of the confidence index of each element of interest 38 by the detection module 34 to a single predetermined threshold value. The upper threshold SH is then equal to the lower threshold SB. For example, the sole threshold is equal to 0.5. In this embodiment, the area of uncertainty between the two thresholds SB, SH does not exist and those skilled in the art will understand that everything happens as if there had not been a confidence index, the detection module 34 detecting or not detecting the presence of an element of interest 38 in a binary manner.

According to an additional aspect of the invention, the electronic control device 26 further includes an activation module 42 configured to command the detection module 34, the activation module 42 being able to detect the presence of a person 44 in the area 40 near the door 22 of the vehicle 10. In particular, the activation module 42 is able to be connected to a device chosen from the group consisting of: a command member 46A able to be actuated by the person 44 near the door 20, a mobile electronic terminal 46B, and a presence sensor 46C for detecting the person 44 near the door 20 The command member 46A is for example a button located next to the door 20, as shown in FIG. 1. This button is for example the button to request to open the door 20. The mobile electronic terminal 46B is for example a mobile telephone or a digital tablet, as visible in FIG. 2. The presence sensor, visible in FIG. 3, is for example a lidar, such as a scanning lidar.

According to one additional aspect of the invention, the electronic control device 26 further includes a generating module 47 configured to generate an information signal S relative to the configuration of the ramp 22. The information signal S is intended for a user or an electronic supervision system, not shown. The information signal S for example comprises information on the current configuration of the ramp 22 and/or on the passage of the ramp 22 from one configuration to the other.

The information signal S is for example a visual signal. The generating module 47 is then able to send the information signal S to a display screen. The screen is for example placed near the door 20, so that the people 44 located in the area 40 near the door 20 receive said information relative to the configuration of the ramp 22.

In a variant, the information signal S is a sound signal. The generating module 47 is then able to send the information signal S to a speaker. The speaker is for example placed near the door 20, so that the people 44 located in the area 40 near the door 20 receive said information relative to the configuration of the ramp 22. This sound information is particularly advantageously when a person 44 with low vision is located in the nearby area 40.

In the example of FIG. 4, the electronic piloting device 26 comprises an information processing unit 48, for example made up of a memory 50 and a processor 52 associated with the memory 50.

In the example of FIG. 4, the detection module 34, the command module 36, the activation module 42 and the generating module 47 are each made in the form of software, or a software component, executable by the processor 52. The memory 50 of the electronic control device 26 is then able to store detection software configured to detect, via at least one sensor 26, at least one element of interest 36 located in an area 40 near the door 22, command software configured to command the passage of the ramp 22 from one configuration to the other configuration as a function of the detection of element(s) of interest 36, a software activation configured to command the detection module 34 and generating software configured to generate an information signal S relative to the configuration of the ramp 22. The processor 52 is then able to execute each of the software applications from among the detection software, the command software, the activation software and the generating software.

In a variant that is not shown, the detection module 34, the command module 36, the activation module 42 and the generating module 47 are each made in the form of a programmable logic component, such as an FPGA (Field Programmable Gate Array), or in the form of a dedicated integrated circuit, such as an ASIC (Application Specific Integrated Circuit).

When the electronic control device 26 is made in the form of one or several software programs, i.e., in the form of a computer program, it is further able to be stored on a medium, not shown, readable by computer. The computer-readable medium is for example a medium suitable for storing electronic instructions and able to be coupled with a bus of a computer system. As an example, the readable medium is an optical disc, a magnetic-optical disc, a ROM memory, a RAM memory, any type of non-volatile memory (for example, EPROM, EEPROM, FLASH, NVRAM), a magnetic card or an optical card. A computer program including software instructions is then stored on the readable medium.

Figure 5:
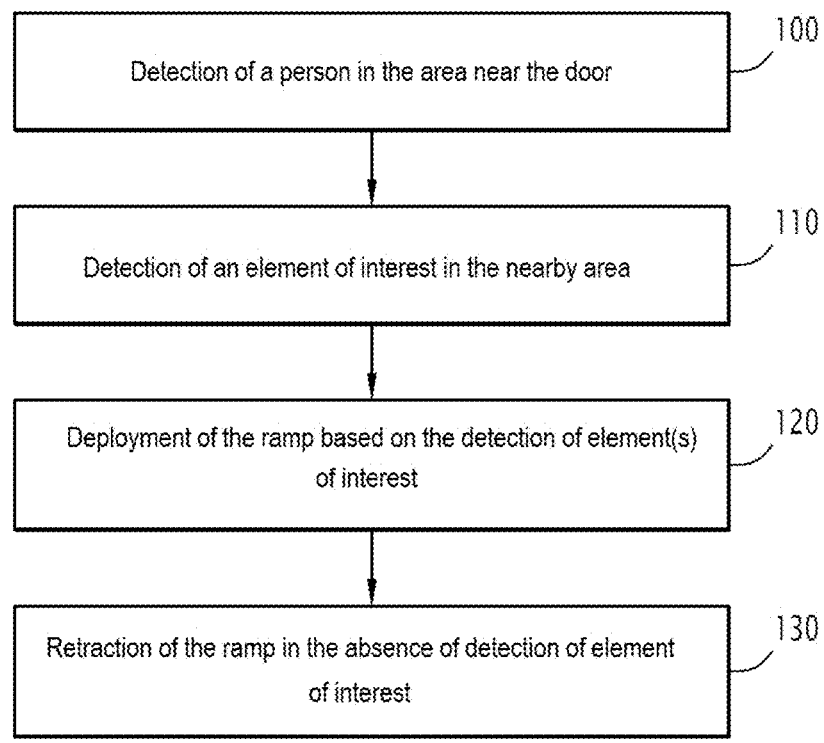
FIG. 5 is a flowchart of a method, according to the invention, for controlling the access ramp of the door of the vehicle of FIG. 1.

The operation of the electronic control device 26 according to the invention will now be explained using FIG. 5 showing an organizational chart of the method, according to the invention, for controlling the ramp 22 for accessing the door 20 of the vehicle 10, the method being implemented by the electronic control device 26.

The vehicle 10 is initially in motion and the ramp 22 is in its retracted configuration, as shown in FIG. 1. The vehicle 10 stops, for example at a bus stop or in a parking place next to a sidewalk 32. At least one person 44 is located in the area 40 near the door 22, as shown in FIG. 3. At least one element of interest 38 is also located in the nearby area 40. The element of interest 38 is for example a characteristic of the person 44, the person 44 being a PRM. Additionally or in a variant, the element of interest 38 is an obstacle 41 capable of hindering the deployment of the ramp 22.

The activation module 42 then detects the presence of the person 44, during an optional step 100. In particular, the person 44 actuates the command member 46A near the door 20. The command member 46A then sends a signal to the activation module 42 in order to indicate the presence of said person 44 in the nearby area 40.

In a variant of the step 100, the person 44 communicates with the activation module 42 via a mobile electronic terminal 46B, for example using a specific software application. In particular, the software application contains information on the mobility of the person 44. The person 44 reserves a place in the vehicle 10 and indicates the location or the stop where the person 44 wishes to enter the vehicle 10. The mobile electronic terminal 46B then sends a signal to the activation module 42 in order to indicate the presence of said person 44 at the location or stop. As an optional addition, the mobile electronic terminal 46B indicates, to the activation module 42, the presence of the person 44 in the nearby area 40 via a geolocation system embedded in the mobile electronic terminal 46B.

In another variant of the step 100, the presence sensor 46C near the door 20 detects the person 44 and sends a signal to the activation module 42 in order to indicate the presence of said person 44 in the nearby area 40.

The activation module 42 next commands the detection module 34, during an optional step. In particular, the activation module 42 activates the detection module 36.

In a variant, the step 100 is not carried out, and the detection module 34 is implemented independently of an activation by the activation module 42, this activation module 42 being optional. The detection module 34 is for example implemented once the vehicle 10 is in use. In a variant, the detection module 34 is implemented when the vehicle 10 is running and temporarily immobilized, for example at a stop for travelers to get on/off.

Then, during a step 110, the detection module 34 detects, via the sensor 24, each element of interest 38 located in the area 40 near the door 20. The detection module 34 then sends a message to the command module 36 comprising at least one piece of information on each element 38 detected by the sensor 24. In particular, the sensor 24 is a camera embedded in the vehicle 10 filming the nearby area 40.

As an optional addition, during step 110, the detection module 34 assigns each element of interest 38 a confidence index as a function of predetermined parameters.

During a step 120, the command module 36 next commands the passage of the ramp 22 from the retracted configuration to the deployed configuration as a function of the detection of element(s) of interest 38, for example the presence of at least one element of interest 38.

In particular, the command module 36 commands the passage of the ramp 22 from the retracted configuration to the deployed configuration only in case of detection of a characteristic of a PRM located outside the travel of the ramp 22.

In a variant or additionally, the command module 36 blocks the passage of the ramp 22 from the retracted configuration to the deployed configuration in case of detection of an obstacle 41 that may hinder the deployment of the ramp 22.

In addition, the command module 36 commands the passage of the ramp 22 from the retracted configuration to the deployed configuration only in case of detection of a characteristic of a PRM located outside the travel of the ramp 22 and in the absence of detection of at least one obstacle 41 located on the travel of the ramp 22.

As an optional addition, the command module 36 commands the passage of the ramp 22 from one configuration to the other configuration as a function of the result of the comparison of the confidence index of each element of interest 38 to at least one predetermined threshold value. In particular, the command module 36 commands the passage of the ramp 22 from the retracted configuration to the deployed configuration only when the confidence index of at least one characteristic of a PRM is above an upper threshold SH and when the confidence index of any potential obstacle 41 is below the lower threshold SB.

In the case where the detection module 34 detects at least one PRM and no obstacle 41 on the travel of the ramp 22, the command module 36 sends a signal to the motor associated with the ramp 22 in order to deploy the ramp 22.

As an optional addition, the generating module 47 then generates an information signal S relative to the configuration of the ramp 22. The information signal S is displayed on a screen or broadcast on a speaker. The information signal S for example indicates that the ramp 22 is in the process of going from the retracted configuration to the deployed configuration.

The ramp 22 then goes from the retracted configuration to the deployed configuration, as shown in FIGS. 2 and 3. The end 30 of the ramp 22 is then in contact with the road 11 or a sidewalk 32, as shown in FIG. 2. The ramp 22 forms a continuous connection extending from the road 11 or the sidewalk 32 toward the floor 28 of the vehicle 10.

As an optional addition, the generating module 47 then generates an information signal S for example inviting the PRM to enter the vehicle 10 when the ramp 22 is in the deployed configuration.

Each PRM embarks on the ramp 22 and enters the vehicle 10.

Then, during a step 130, the command module 36 next commands the passage of the ramp 22 from the deployed configuration to the retracted configuration as a function of the detection of element(s) of interest 38, for example in the absence of elements of interest 38.

In particular, the command module 36 commands the passage of the ramp 22 from the deployed configuration to the retracted configuration when the detection module 34 no longer detects an element of interest 38 in the nearby area 40.

In a variant or additionally, the command module 36 blocks the passage of the ramp 22 from the deployed configuration to the retracted configuration in case of detection of an obstacle 41 that may hinder the retraction of the ramp 22.

As an optional addition, the command module 36 commands the retraction of the ramp 22 as a function of the result of the comparison of the confidence index of each element of interest 38 to at least one predetermined threshold value. In particular, the command module 36 commands the retraction of the ramp 22 when the confidence index of each element of interest 38 is below the lower threshold SB.

In the case where the detection module 34 does not detect a PRM or an obstacle 41 on the travel of the ramp 22, the command module 36 sends a signal to the motor associated with the ramp 22 in order to retract the ramp 22.

As an optional addition, the generating module 47 then generates an information signal S relative to the configuration of the ramp 22. The information signal S for example indicates that the ramp 22 is in the process of going from the deployed configuration to the retracted configuration.

The ramp 22 then goes from the deployed configuration to the retracted configuration.

One can thus see that the electronic control device 26 according to the invention, and the associated control method, make it possible to improve the access for persons 44, in particular for PRM, wishing to enter the vehicle 10, or to leave the vehicle 10. The electronic control device 26 therefore makes it possible to provide a quality service and improved support for PRMs wishing to move on or the vehicle 10.

The electronic control device 26 allows an algorithmic and automatic verification of elements of interest 38 near the vehicle 10. The electronic control device 26 is then able to be implemented in an autonomous motor vehicle in particular. Indeed, when the vehicle 10 is an autonomous motor vehicle, the placement of the ramp 22 is particularly complicated without the electronic control device 26 according to the invention.

The electronic control device 26 further allows improved speed and safety in the deployment of the ramp 22 and thus makes it possible to avoid delays due to a lengthy and tedious deployment of the ramp 22 each time the vehicle 10 is stopped.

Lastly, the electronic control device 26 makes it possible to protect the ramp 22 from damage caused by impacts with obstacles placed on the sidewalks 32 and thus significantly increases the lifetime and the reliability of the ramp 22.

The invention claimed is:

1. An electronic device for controlling an access ramp to a door of a vehicle, the ramp being able to move from a retracted configuration to a deployed configuration, the electronic device including:
   a detection module configured to detect, via at least one sensor, at least one element of interest located in an area near the door, each sensor being able to be connected to the detection module; and
   a command module configured to command the passage of the ramp from one configuration to the other configuration as a function of the detection of at least one element of interest,
   wherein the at least one element of interest is a characteristic of a person with reduced mobility, and
   wherein the command module is configured to command the passage of the ramp from the retracted configuration to the deployed configuration only if a characteristic of a person with reduced mobility is detected.

2. The electronic device according to claim 1, wherein the at least one of the sensors is a camera embedded in the vehicle.

3. The electronic device according to claim 1, wherein, for each point of the nearby area, the distance between the door and said point is smaller than a maximum predetermined distance, and
   wherein the maximum predetermined distance is between 20 cm and 75 cm.

4. The electronic device according to claim 1, wherein the electronic device further includes an activation module configured to command the detection module, the activation module being able to detect the presence of a person in an area near the door of the vehicle.

5. The electronic device according to claim 1, wherein each element of interest is chosen from the group consisting of:
   the characteristic of a person with reduced mobility; and
   an obstacle that may hinder the passage of the ramp from one configuration to the other.

6. A electronic device for controlling an access ramp to a door of a vehicle, the ramp being able to move from a retracted configuration to a deployed configuration, the electronic device including:
- a detection module configured to detect, via at least one sensor, at least one element of interest located in an area near the door, each sensor being able to be connected to the detection module; and
- a command module configured to command the passage of the ramp from one configuration to the other configuration as a function of the detection of at least one element of interest,
- wherein the detection module is configured to assign each element of interest a confidence index as a function of predetermined parameters, the command module being able to command the passage of the ramp from one configuration to the other configuration as a function of the result of the comparison of the confidence index of each element of interest to at least one predetermined threshold value.

7. The electronic device according to claim 1, wherein the electronic device further includes a generating module configured to generate an information signal relative to the configuration of the ramp, the information signal being intended for a user or an electronic supervision system.

8. A method for controlling an access ramp to a vehicle door, the control method being implemented by an electronic control device and comprising the following steps:
- detecting, via at least one sensor, at least one element of interest located in an area near the door, wherein the at least one element of interest is a characteristic of a person with reduced mobility;
- commanding the passage of the ramp from a retracted configuration to a deployed configuration only if a characteristic of a person with reduced mobility is detected as a function of the detection of at least one element of interest.

9. A method for controlling an access ramp to a vehicle door, the control method being implemented by an electronic control device and comprising the following steps:
- detecting, via at least one sensor, at least one element of interest located in an area near the door;
- assigning each element of interest a confidence index as a function of predetermined parameters
- commanding the passage of the ramp from one configuration to another configuration as a function of the result of the comparison of the confidence index of each element of interest to at least one predetermined threshold value.

* * * * *